March 15, 1960  J. V. ELLISON ET AL  2,928,708
SIGNAL RECORDING SYSTEM
Filed June 28, 1955
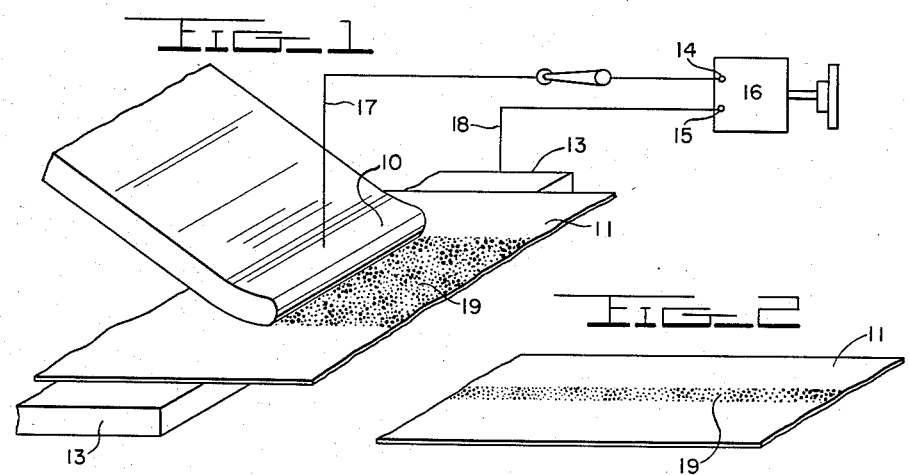
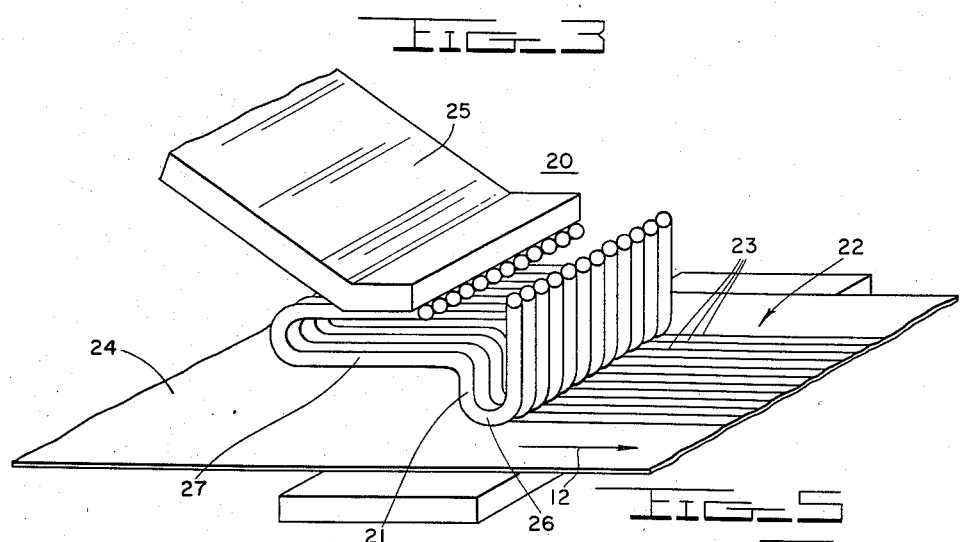
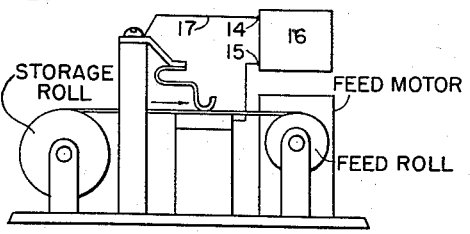
INVENTORS
JOHN V. ELLISON
WERNER G. NEUBAUER
BY
*Howard White*   ATTORNEYS

2,928,708
Patented Mar. 15, 1960

2,928,708

SIGNAL RECORDING SYSTEM

John V. Ellison, Washington, D.C., and Werner G. Neubauer, Arlington, Va.

Application June 28, 1955, Serial No. 518,706

6 Claims. (Cl. 346—74)

(Granted under Title 35, U.S. Code (1952), sec. 266)

The invention described herein may be manufactured and used by or for the Government of the United States of America for governmental purposes without the payment of any royalties thereon or therefor.

The present invention relates to recording systems and particularly to improvement in sensitivity of systems for establishing a visible record display of amplitude information in the form of a record color trace or mark on a suitable record sheet or web variable in visible characteristics in proportion to variations in signal amplitude.

In an attempt to record signal amplitude variations by a single, color line trace varying in color intensity in proportion to signal strength, the number of just-noticeable-differences is greatly limited due to the small adjacent areas available for comparison in a single line.

Desire to increase the width of a record trace to obtain a wide strip of adjacent areas for ease of comparison suggested the use of a record sheet of electrochemical recording paper with a wide marker element, but this was found to be objectionable in giving a wider but confused mottled area due to the inevitable irregular texture or mat surface of electrochemical recording paper, the coarse mottled area tending to obscure the boundary or broaden the margin between adjacent areas of slightly different average color intensities. Pressure necessary to iron out such irregularities was found to add excessive drag on the record sheet and to produce excessive wear of the marker element. While the wider trace made by a wide marker gives larger adjacent areas facilitating comparison, the greatest possible number of just-noticeable-differences can be greatly increased, in the present instance to 50, by the use in combination of an electrochemical recording paper with a plurality of closely spaced recording contact elements whereby the record trace takes the form of a relatively broad strip composed of a plurality of spaced parallel lines, varying both in color intensity and width in accordance with variation in the quantity of electricity passing from the contact elements through the record sheet.

It has also been found that by the use of a marker of the desired width, built up of a plurality of contact stylus elements arranged side-by-side in spaced relation, each stylus element may be resiliently mounted independently of the others to bear upon the record sheet with just sufficient force to follow irregularities in the surface of the record sheet along its narrow path of contact to a degree to produce a substantially unbroken record trace but insufficient to cause undue wear of the material of the styluses. The record trace thus obtained may be used as a single trace record, or as a multiplicity of juxtaposed traces forming a two-dimensional record such as a picture or facsimile recording.

An object of the present invention is the provision of a signal amplitude recording system capable of recording in a visible color trace, slight variations in signal strength with a maximum number of just-noticeable-differences within the range from threshold of visibility to maximum density of record trace.

Another object is the provision of a recording system presenting to the eye of an observer, a record trace in the form of a strip of successive colored areas of substantial width as distinguished from a line, whereby to enable an observer to more readily detect slight variations in tone or color intensity of adjacent areas representing variations in signal strength.

An ancillary object is the provision for the use of a wide line marker electrode in combination with known forms of electrochemical record paper having the usual mat surface with adequate pressure between the marker electrode and record sheet to substantially iron out small surface irregularities due to the non smooth or mat surface without undue wear of the marker.

Various other objects and advantages of the invention will become apparent from a perusal of the following specification and the drawings accompanying the same.

In the drawings:

Fig. 1 illustrates diagrammatically and on a greatly enlarged scale an area trace recording system using a wide solid marker electrode.

Fig. 2 shows a portion of an area record trace made by a solid, one-eighth inch electrode about actual size.

Fig. 3 is a large scale diagrammatic illustration of a preferred embodiment of the present invention.

Fig. 4 is an enlarged view of a portion of an area trace made with the improved recording system showing several readily noticeable differences in strength of signal recorded.

Fig. 5 is a diagrammatic view showing conventional means for effecting relative movement between record sheet and record markers.

Referring to the drawings in detail, Fig. 1 illustrates diagrammatically and on a much enlarged scale, of the order of twelve times actual size, a recording system using a single wide marking electrode 10 about one-eighth inch wide with a strip 11 of electrode chemical recording paper of known type mounted for movement relative to the marking electrode as indicated by the adjacent arrow 12 and so moved by any known or other suitable means such as indicated diagrammatically in Fig. 5. The electrode makes contact with the paper along a line transverse to the direction of relative motion between the two, here indicated as a motion of the record strip in the direction of the arrow 12 under the stationary electrode 10. Signal current may be passed through the record sheet via the marker electrode in any known or other suitable manner as by use of the usual platen element 13 of conducting material, between which and the marker electrode the record sheet is passed in contact with both to complete a circuit between the two and across the output terminals 14—15 of a signal source 16 via conductors 17—18. The source 16 may be a signal receiver having its input connected with a hydrophone for receiving underwater compressional wave signals.

The single broad marker was used as in Fig. 1 to produce an area trace of substantial width distinguished from a line trace, in an attempt to produce a record trace covering a succession of juxtaposed areas of substantial magnitude which would facilitate comparison of color intensities of such juxtaposed areas representing strength of signals recorded.

However, with the above system, receipt of a signal of constant intensity was found to produce a color strip not of even tone but considerably mottled, as indicated at 19 in Fig. 1, due to irregularities in surface texture unavoidable with mat surface record sheets, such as used in known types of electrochemical recording paper. Because of the limitation in a line drawing to markings of uniform color density, stipling is here resorted to and used in varying densities to indicate variations in color density or tone. It will be understood that the mottling consists more in the form of blotches merging some through gradual and some through abrupt variations in tone. A portion of such an area trace in substantially actual size, about one-eighth of an inch wide, is shown in Fig. 2. It will be understood how a small slightly elevated area of the record sheet of a width of only a small fraction of the width of the marking electrode will increase the pressure at its point of contact and lessen the pressure at other points, and may even prevent other portions of the electrode from contacting the record sheet. It will also be clear how slight depressions in the record sheet may miss contact or permit only very light contact with the electrode.

Now according to the present invention the same known type of electrochemical recording paper is used having the usual characteristic of producing a record mark increasing both in color intensity and area with increase in the quantity of electricity passing through the record sheet, but in combination with a multiple stylus marker electrode 20, as shown in Fig. 3. Here the marker is made up of a plurality of marker styluses 21 contacting the record sheet at points spaced apart transversely of the direction of relative motion between the record sheet and the marker. The broad record trace 22 now takes the form of a record strip consisting of a plurality of spaced parallel lines. In Fig. 3, for the sake of clearness, essential elements of the system are shown diagrammatically and on a greatly enlarged scale of the order of 11 times actual size. With the new system the receipt of a signal of constant strength is found to produce a plurality of evenly spaced parallel record lines 23 of substantially the same width and color intensity. This is believed to be due to the fact that each stylus element 21 contacts the record sheet 24 at a small rounded surface of the stylus permitting the stylus to iron out minor irregularities on the record surface; that each stylus is individually resiliently supported to exert sufficient pressure to contact the record sheet at all times and tend to follow major irregularities in its path; and that each stylus so acts independently of the others whereby any variation in the contact pressure of one due to surface irregularities will not influence the contact pressure of the others. However due to the characteristics of electrochemical paper as mentioned above, the receipt of successive signals increasing in strength by slight steps will produce a record strip in which the parallel lines simultaneously increase in both color intensity and width of line in response to increase in signal strength. Such a record strip is illustrated diagrammatically in Fig. 4 on an enlarged scale of the order of 5 times actual size. Due to the limitations of line drawing, the variation in color intensity is not shown but it will be understood that the thicker lines have greater color intensity than the thinner lines. Thus in addition to the variation in color intensity there is the reciprocal variation in size of small alternate colored and uncolored areas as in half-tone photoengraving. This results in a combined effect greater than the sum, or a kind of synergism, of the three variables, color intensity, width of line and width of unmarked space between lines which makes for an increase in preceptibility of slight variations in the signal record. With the improved recording system above described, using the combination of electrochemical record paper and multiple stylus marker, the possible number of just-noticeable-differences has been raised to about 50, as distinguished from the limitation to about 20 just-noticeable-differences obtainable with the use of a single broad marker electrode.

In one practical embodiment of the invention, the multiple stylus marker element 20 comprises supporting arm 25 formed of a beryllium copper strip to which is secured, by silver soldering, a lineal array of twelve marker styluses 21 each formed from a section of 30% iridium-platinum alloy 10-mil diameter round wire. Each stylus 21 is bent to a U form near its free end to form a rounded contact area 26, and provided with a relatively long loop section 27 between the contact area 26 and the soldered junction with the supporting arm 25. In the present instance a loop section of approximately one-eighth inch in length which constitutes supporting means for the contact stylus element of which it is a part, is found to afford sufficient resilience and pressure to enable to contact area of the stylus to maintain adequate contact with the record sheet while permitting the rounded contact area to closely follow the paper surface irregularities. This ability of the stylus to follow the paper surface irregularities is enhanced by making the contact area of each stylus of the order of magnitude of the spaces between fibers protruding from the body of the paper. For the one-eighth inch wide area trace desired, twelve styluses each of 10-mil round wire are used. The use of round wires as here shown provides the desired gaps between adjacent points of contact with the record sheet with the wires mounted as close as structurally possible. However, since the spacing between adjacent points of contact is an important feature of the invention, it will be understood that where the dimensions and shape of the stylus supports and areas of contact with the paper are such as would permit substantial elimination of spacing, there should be provided suitable spacing between the areas of contact with the paper such that at the threshold of visibility of the record trace the record lines have a minimum width which does not exceed one half that of the space between adjacent lines.

While one specific embodiment of the invention has been shown and described herein for the purpose of disclosure, it is to be understood that the invention is not limited to such specific embodiment but contemplates all such modifications and variants thereof as fall fairly within the scope of the appended claims.

What is claimed is:

1. A recording system comprising a record element of electrochemical recording paper of the type in which a mat surface is inevitable and a record mark made by signal current passing between a recording contact element and the paper spreads beyond the contact area an amount proportional to the quantity of electricity so passing, a single marker element comprising a plurality of contact elements, a platen element mounted relative to said marker, said record element mounted for relative movement between said marker and said platen element with the contact elements of the marker in contact with the record element at points closely spaced transversely of the direction of said relative movement, and of a contacting area sufficiently small to follow irregularities in the mat surface of the record sheet, resilient supporting means, one for each of said contact elements for maintaining its contact element in contact with the record paper under sufficient pressure relative to the physical characteristics of the paper to provide a substantial smoothing out of fine surface irregularities of the paper along the line of contact and circuit means directing signal current through said marker, said platen element and record paper via the several contact elements to record upon said record paper a plurality of identical parallel record lines representing variations in strength of said signal current.

2. In an electrochemical recording system using a record sheet of electrochemical paper of the type in which a mat surface with its concomitant surface irregularities is inevitable, an electrical marker element, and a single platen element of electrical conducting material between which marker and platen said record sheet is moved, said marker element comprising a plurality of independently resiliently mounted electrical marking styluses electrically connected in parallel for simultaneously recording the same signal and arranged to contact the record sheet at points evenly spaced apart along a substantially straight line, and circuit means directing a common signal current through said record sheet and single platen by way by way of all of said styluses simultaneously producing a band of closely spaced parallel record lines of the same signal upon movement of the record sheet in a direction normal to said line of spacing whereby any stylus may ride over inequalities in the record sheed without affecting other styluses recording the same signal.

3. A recording system comprising an electrochemical record sheet of a type responsive to the flow of current therethrough at an area of contact with an electric marker element adapted to produce a record mark varying in record intensity in proportion to the quantity of electricity passing therethrough, a platen element of electrical conducting material in contact with one side of the record sheet, said marker element comprising a plurality of electric marker contact elements resiliently mounted to one end thereof and arranged in contact with the other side of the record sheet to trace a band of parallel paths along the record sheet upon relative movement between the record marker element and the record sheet, and circuit means connecting all said contact elements in common to the platen through the record paper with a source of signal current to be recorded, whereby a signal derived from said signal source is recorded simultaneously along a plurality of substantially identical record lines, said record lines form a band several times wider than the trace of a single contact element to provide a record trace of sufficient width to facilitate comparison of the record intensity of adjacent areas representing variations in strength of signal current.

4. A recording system comprising a sheet of electrochemical recording paper of a type in which spaced record marks made by the passage of a signal current through the paper tend to darken and spread toward each other and amount proportional to the quantity of electricity passing through the paper, a group of contact elements connected in multiple to a supporting arm and resiliently mounted to press upon one side of the record paper independently of each other at points of contact spaced apart along a substantially straight line, an electrically conducting platen element contacting the other side of the paper for cooperation with all said contacts in common to complete the circuits through the contacts and paper in multiple to the common platen, said group of contact elements and the record paper being mounted for relative movement in a direction normal to said line of spacing, a common signal current adapted to pass through said common platen to all of said points of contact, said signal current produces a plurality of substantially identical line records of variations in strength of said signal current varying in darkness and spacing between the line records proportional to strength of signal.

5. A stylus marker for use in a recording system including an electrochemical recording paper which comprises an elongated flat support arm adapted to be secured at one end in a recording system and connected to an electrical conductor in said recording system to provide a free end, a plurality of resiliently mounted wire-like marker styluses secured linearly to the free end of said support arm in parallel side by side alignment across the flat surface of said support arm, said marker styluses extending from said secured point to a U-shaped end portion with the bend of the U serving as the recording portion of each separate styli, said styluses having independent movement parallel with each other and perpendicular to the surface of said recording paper.

6. A stylus marker for use in a recording system including an electrochemical recording paper which comprises an elongated flat support arm adapted to be secured at one end in a recording system and connected to an electrical conductor in said recording system to provide a free end, a plurality of resiliently mounted wire-like marker styluses secured linearly to the free end of said support arm in parallel side by side alignment across the flat surface of said support arm and extending from said flat surface to a face end said marker styluses having a looped section extending from said secured point to a U-shaped portion at its free end with the bend of the U extending angularly relative to the loop of said styluses, said styluses having independent movement parallel with each other and perpendicular to the surface of the recording paper.

References Cited in the file of this patent

UNITED STATES PATENTS

| | | |
|---|---|---|
| 2,066,880 | Eissfeldt | Jan. 5, 1937 |
| 2,124,410 | Cockrell | July 10, 1938 |
| 2,615,777 | Leuth | Oct. 28, 1952 |
| 2,644,738 | Gardner | July 7, 1953 |
| 2,672,394 | Jeswine et al. | Mar. 16, 1954 |
| 2,719,775 | Erving | Oct. 4, 1955 |